G. P. Kelsey,
Grain Cradle.
No. 10,186.          Patented. Nov. 1, 1853.
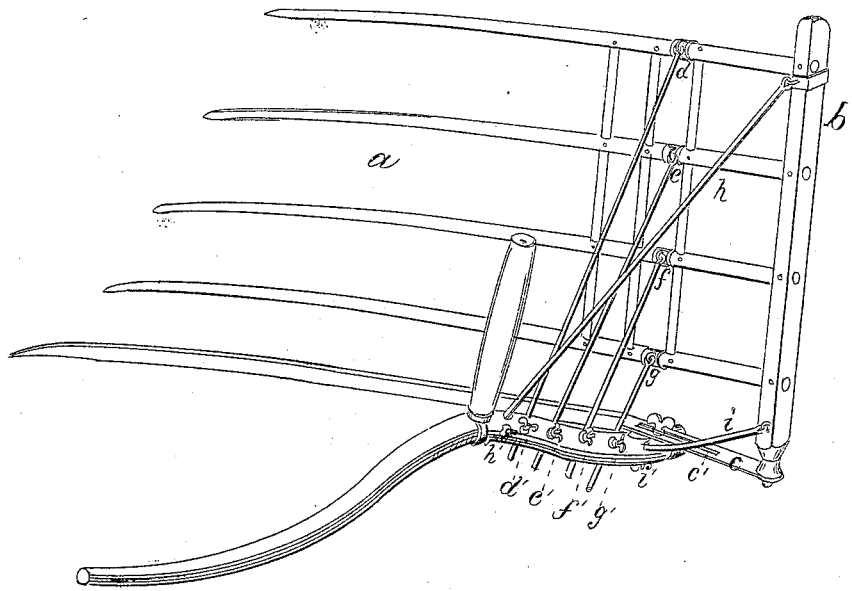
Fig. I.
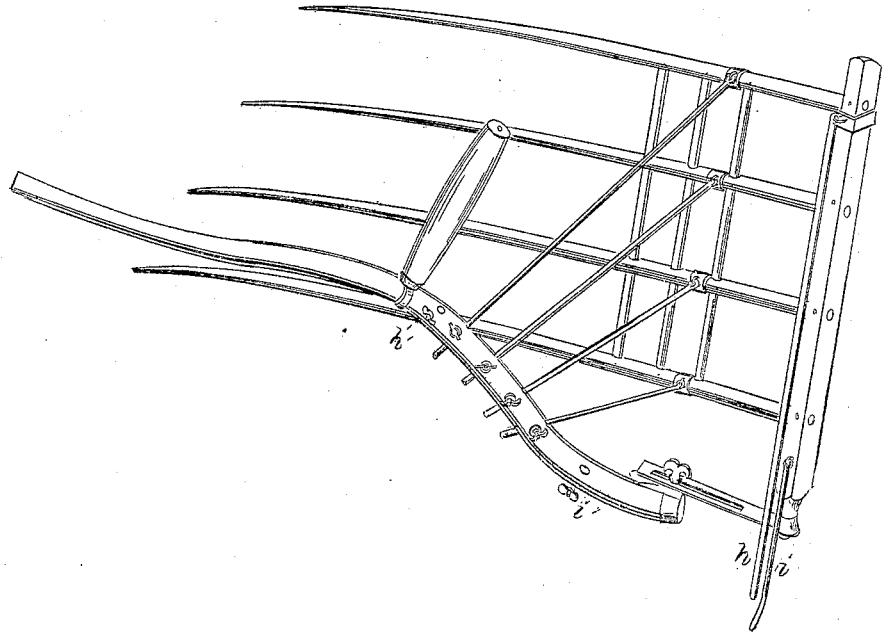
Fig. II.

UNITED STATES PATENT OFFICE.

CHRISTOPHER P. KELSEY, OF LIVINGSTONVILLE, NEW YORK.

IMPROVEMENT IN GRAIN-CRADLES.

Specification forming part of Letters Patent No. 10,186, dated November 1, 1853.

*To all whom it may concern:*

Be it known that I, CHRISTOPHER P. KELSEY, of Livingstonville, county of Schoharie, and State of New York, have invented certain new and useful Improvements in Grain-Cradles; and I do hereby declare that the following is a full, clear, and exact description of the same, reference being made to the annexed drawings, making a part of this specification, in which—

Fig. I is a perspective view of my cradle as ready for operation in the field. Fig. II is a view in perspective, showing the snath closed against the fingers, and similar letters refer to similar parts throughout.

My invention consists in so constructing the cradle that not only shall the workman be enabled to lay the grain more regularly, to cut the entire length of the scythe, and to readily adjust the set or "hover" of the fingers as compared with the snath and scythe, but also that the implement shall balance better in the hands, and shall be capable of being folded closely together when not in use, whereby it may be more easily transported or stowed away, as the case may be.

The construction is as follows: The fingers $a$ and post $b$ are made and attached together, as in the ordinary cradle; but instead of setting the foot of the post directly upon the lower end of the snath, I employ a bar of iron, $c$, to make the connection. This bar has a slot in it at $c'$, through which a thumb-screw passes to secure the bar to the snath in the manner shown. At the other end of the bar is an eye or socket to receive the lower end of the post, which is here made a pivot, that the post may have a slight vibratory motion. Each finger has the usual brace extending from it to the snath; but instead of being rigidly fixed in the finger I attach the braces by joints or links, as at $d\ e\ f\ g$, for the purpose of making the position of the fingers adjustable. The other ends pass through the snath and are secured in any desired place by set-screws, as seen at $d'\ e'\ f'\ g'$. The post has also two braces, of similar construction, connecting it with the snath, and seen at $h\ i$, secured in place, likewise, by set-screws $h'\ i'$. The length of the bar $c$ must be such that the places on the fingers to which the braces are hinged may be directly over the heel of the scythe in order that the entire length of that may be available for cutting.

The operation will be thus: The implement will balance better in the hands of the husbandman, for the reason that a portion of the heavier end of the frame of fingers is brought to the right of the foot of the snath, and hence the weight of that portion serves as a counterpoise to that of the remaining part of the fingers. The hover or degree of inclination of the frame of fingers from or toward the operator is readily adjusted to any desired position, and is there secured by the set-screws acting upon the braces $d\ e\ f\ g$ of the fingers, and the points of the fingers may then be moved toward or from the operator, as desired, that position being secured by the set-screws upon the braces $h\ i$ of the post. The hover is thus so easily adjusted to suit the leaning or inclination of the grain to be cut that the farmer may alter his cradle on each side of a large field, instead of being compelled to walk back to take the next swath, as is often the case when the grain is "lodged."

When not wanted for use the implement may be folded close by unhanging the scythe, slacking up the thumb-screw which secures the bar $c$ to the foot of the snath, and then, on withdrawing the braces of the post from the snath, that can be readily swung round against the fingers, as shown in Fig. II, the braces $d\ e\ f\ g$ turning on their hinges and the braces $h\ i$ hanging against the post to which they are hinged.

What I claim as of my own invention, and desire to secure by Letters Patent, is—

1. The bar $c$, or its equivalent, for attaching the frame of fingers to the snath, for the purposes set forth.

2. So connecting the braces $d\ e\ f\ g$ with the fingers, by means of link or other universal joints, that the snath may be folded close against the fingers without requiring that the said braces shall be loosened in the snath, the whole being constructed and operating substantially in the manner set forth.

CHRISTOPHER P. KELSEY.

Witnesses:
S. H. MAYNARD,
GEO. K. SHERMAN.